United States Patent
Emery et al.

(10) Patent No.: US 6,378,379 B1
(45) Date of Patent: Apr. 30, 2002

(54) FORCE-REDUCTION MECHANISM FOR A FORCE-MEASURING DEVICE

(75) Inventors: Jean-Christophe Emery, Schwerzenbach; Thomas Köppel, Oetwil; Marc Iseli, Uster, all of (CH)

(73) Assignee: Mettler-Toledo GmbH, Breifensee (CH)

(*) Notice: Subject to any disclaimer, the term of this patent is extended or adjusted under 35 U.S.C. 154(b) by 0 days.

(21) Appl. No.: 09/651,347

(22) Filed: Aug. 29, 2000

(30) Foreign Application Priority Data

Sep. 11, 1999 (DE) .......................... 199 43 439

(51) Int. Cl.[7] ................................ G01N 3/02
(52) U.S. Cl. ........................ 73/856; 177/210
(58) Field of Search ............... 73/856, 862.391, 73/862.451, 862.474, 862.621, 862.393; 177/210

(56) References Cited

U.S. PATENT DOCUMENTS 4,196,784 A * 4/1980 Suzuki et al. ............ 177/211
4,454,770 A * 6/1984 Kistler .................... 73/862.65
5,866,854 A * 2/1999 Emery et al. ............ 177/50
6,232,567 B1 * 5/2001 Bonino et al. ............ 177/210

FOREIGN PATENT DOCUMENTS

| DE | 4305425 | 8/1994 |
| DE | 4305426 | 8/1994 |
| DE | 296 13 668 U1 | 4/1997 |
| DE | 197 29 623 A1 | 1/1999 |
| EP | 0518202 | 12/1992 |

* cited by examiner

Primary Examiner—Max Noori
(74) Attorney, Agent, or Firm—Friedrich Kueffner

(57) ABSTRACT

A force-reduction mechanism for a force-measuring device is made of a monolithic material block (1) and has a stationary support (8), a plurality of levers (9, 15, 17), and coupling elements (11, 14, 16) connecting the levers. The fulcrum (10a) of at least one lever (17) is movable in relation to the stationary support (8). A movable fulcrum (10a) can, e.g., be located on a preceding lever (9), so that the fulcrum (10a) shares the motion of the preceding lever (9). The concept of a movable fulcrum allows a more space-efficient design of the mechanism.

8 Claims, 3 Drawing Sheets

FORCE-REDUCTION MECHANISM FOR A FORCE-MEASURING DEVICE

BACKGROUND OF THE INVENTION

The present invention relates to a force-reduction mechanism with a plurality of levers for a force-measuring device. The levers follow each other in a functional sequence where the force to be reduced is transmitted from one lever to the next by way of coupling elements. The force is introduced by way of a first coupling element into a first lever that is rotatably supported by a fulcrum on a stationary support. Mechanisms of the kind that the invention relates to have at least one additional lever beyond the first lever. The additional lever is connected by a coupling element to a preceding lever within the functional sequence of levers. Furthermore, in the kinds of mechanisms envisaged by the invention, the stationary support, coupling elements and levers are configured at least in part as portions of a monolithic material block.

Force-reduction mechanisms for a force-measuring device are known from EP 0 518 202 B1, where a force is reduced by means of at least one lever that is rotatably supported on a stationary support, the force being introduced into the lever by way of a coupling element. The stationary support, coupling elements and levers are configured as separate portions of a monolithic material block. In order to achieve large reduction ratios, embodiments are described which have two or three serially arranged levers connected by coupling elements. The levers are designed for a degree of structural strength commensurate with the load that each of them is exposed to, and they are essentially disposed at vertical positions immediately above one another. The fulcrum or pivotal axis of each lever, i.e., the resting point of the lever, is designed as a slender, flexible portion through which each lever is connected to the stationary support. If the input force into the mechanism is large, the fulcrum reactions of the levers will be of a corresponding magnitude. Consequently, the stationary support will have to be designed for adequate rigidity in the areas between its mounting portion and all of the fulcra. Thus, to meet a given minimum of structural rigidity, the stationary support needs to have the appropriate geometric dimensions. Accordingly, a certain predetermined portion of the monolithic material block has to be set aside for the stationary support. The customary dimensions of material blocks used in this application allow for two or possibly three levers and a stationary support of appropriate dimensions, together with a parallelogram linkage surrounding the force-reduction mechanism with two parallel-guiding members extending from a fixed leg to a movable leg of the parallelogram.

As mentioned in EP 0 518 202 B1, if a larger number of levers are provided in order to achieve larger reduction ratios, it will be necessary to either use a larger material block or to reduce the dimensions of the stationary support to allow for the additional lever volume. Each additional lever has to be supported by an adequately rigid portion of the stationary support. The levers following each other in sequence are arranged essentially parallel to each other, meaning that an imaginary longitudinal line defined by the fulcrum and the coupling pivots of each lever runs essentially parallel with the corresponding imaginary lines of the other levers. This imposes design limitations on the possible spatial arrangements for the levers, the stationary support, the fulcra and the coupling elements. The fulcra of sequentially adjacent levers are in alternating positions near opposite ends of their respective levers. Accordingly, the middle portion of the stationary support between the fulcra at opposite sides is weakened because of the material taken up by the levers. Thus, with a material block of customary size, it is impossible to increase the number of levers without a loss of structural rigidity. However, the use of a larger material block is undesirable, because the force-transmitting mechanism needs to be designed as a component fitting into an overall force-measuring system. If this one component were redimensioned, other components including standardized parts shared with other systems would likewise have to be changed.

OBJECT OF THE INVENTION

It is therefore the object of the present invention, to provide a force-reduction mechanism in which large reduction ratios can be achieved in a compact space.

SUMMARY OF THE INVENTION

In accordance with the present invention, the foregoing objective can be met by a force-reduction mechanism with a plurality of levers following each other in a functional sequence. The force to be reduced is passed from one lever to the next by way of coupling elements. The force is introduced through of a first coupling element into a first lever that is rotatably supported by a fulcrum on a stationary support. Beyond the first lever, the mechanism according to the invention has at least one additional lever. The additional lever is connected by an additional coupling element to a lever that precedes the additional lever in the functional sequence of levers. The stationary support, coupling elements and levers are configured at least in part as distinct portions of a monolithic material block. In the force-reduction mechanism proposed by the invention, at least one of the additional levers has a fulcrum axis that is movable in relation to the stationary support.

The present invention is based on the observation that the use of only spatially fixed fulcra or pivotal supports for the levers represents a severe limitation on the possible layouts for additional levers and the possible reduction ratios. Given that the coupling elements connecting the levers can transmit tensile forces only, the connection from the second to the third lever at the latest will require a space-consuming reach-around portion to be added to one of the levers. For example in FIGS. 5 and 7 of EP 0 518 202 B1, already the first lever reaches laterally around the second lever. A reach-around portion of this kind needs to have a lever portion designed for a compressive load and a coupling element designed for a tensile load. The compressive lever portion reaches laterally from one lever around the other and thereby unnecessarily reduces the possible length of the lever that lies inside the reach-around portion. This represents an undesirable design limitation, given that in any event the levers have to be progressively shorter in order to allow each of the levers to rest on a fixed fulcrum on the stationary support.

It has been found that the force-reduction potential, i.e., the attainable reduction ratio in relation to the volume or to the largest side surface of the material block, can be increased by using at least one additional lever with a fulcrum axis that is movable in relation to the stationary support. In an advantageous embodiment of the invention, the movable fulcrum of a lever is located on a preceding lever. As is obvious in this embodiment as well as in general, a lever fulcrum that is fixed on a preceding lever participates in the movement of the preceding lever.

A preferred embodiment of the invention has a first, second and third lever arranged in a functional sequence.

The respective fulcra of the first and second lever are located on the stationary support, while the fulcrum of the third lever is located on the first lever and thus shares the movement of the first lever.

A further developed embodiment of the inventive concept has four levers in a functional sequence. The respective fulcra of the first and second lever are located on the stationary support. The fulcrum of the third lever is located on the first lever and thus shares the movement of the first lever, while the fulcrum of the fourth lever is located on the second lever and thus shares the movement of the second lever.

The advantage of a movable fulcrum is that is requires no space on the stationary support. Also, the concept of a movable fulcrum provides more freedom in the design of force-reduction mechanisms. In particular, it eliminates the need for reach-around portions of levers, so that the freed-up space can be used for force-reduction elements. The levers with movable fulcra or pivotal axes allow a more space-efficient arrangement with respect to the attainable force-reduction ratio. Due to the advantage that no reach-around elements are needed for transmitting the force, the entire space taken up by each lever can be used to the benefit of the force-reducing function.

A lever that has its fulcrum axis fixed on a preceding lever of the force-reducing mechanism can be entirely surrounded by preceding levers. In an arrangement of this kind, the surrounded lever does not impose any design limitations on the shape of the stationary support nor on the way in which the dimensions and proportions of the surrounding levers are used to perform their force-reducing function. As in the known state-of-the-art devices, only a first part of the last lever in the force-reduction chain belongs to the monolithic material block. The remaining part of the last lever is an extension, attached to the first part by means of two bore holes. The extension is shaped like a fork, extending along both sides of the material block and ending, e.g., at a measuring or compensating device. The same two-part configuration is also possible when the first part of the last lever is surrounded by preceding levers. Even with more than two levers, a nested, spiral-like arrangement of a lever chain makes it possible to connect the successive levers only through coupling elements, i.e., without the need for reach-around, compressively loaded lever portions.

As can be demonstrated through model calculations and experiments, if at least one lever has its fulcrum axis on a preceding lever, the total reduction- or magnification ratio is slightly larger than the product of the ratios of the individual levers. The reduction ratio was determined for a mechanism with three levers where the fulcrum of the third lever was located on the first lever. In the example that was analyzed, the first lever had a short arm of 11.8 mm and a long arm of 66.2 mm. The second lever had arm lengths of 4.5 mm and 52 mm, respectively. The third lever had a short arm of 4.5 mm and a long arm of 101 mm, including a fork-shaped extension beyond the material block. The multiplication of the individual reduction ratios would lead to an overall ratio of 1/1455. With a correction allowing for the fact that the third lever fulcrum is located on the first lever, the effective reduction ratio turns out to be 1/1494. With the fulcrum of the third lever being located on the first lever, the correction leading to the effective reduction ratio depends on the distance between the respective fulcra of the first and third lever. In the subject case, the distance was 14.2 mm. This leads to the conclusion that the reduction ratio is increased if the fulcrum of a lever is located on a preceding lever of the mechanism. In addition to the space savings, the increase of the lever-reduction ratio is a further advantage of the inventive concept, according to which at least one lever rests on a fulcrum that is fixed on a preceding lever.

Also included among levers with a movable fulcrum are knee-joint levers. Knee-joint levers are force-reducing or or-magnifying devices with a force-introduction arm, a force-output arm, and an anchored arm, the three arms being connected to each other at a pivotal hub. When a force is applied to the force-introduction arm, the pivotal hub will be subjected to a slight displacement. Thus, by extension of the term fulcrum, the pivotal hub could also be called the movable fulcrum of the knee-joint lever.

In a knee-joint lever with a force-introduction arm, a force-output arm, and an anchored arm, the forces in the arms are in essence tensile forces, which can be transmitted through members with compact material cross-sections. The force-reduction ratio of a knee-joint lever is determined by an angle rather than by an arm-length ratio. Thus, very large reduction ratios can be achieved within the most compact space. Because of the essentially horizontal orientation of the first lever receiving the force to be reduced as well as of the last lever extending with its fork-like second part beyond the material block into a measuring or compensating device, it is necessary for coupling elements from the intermediate levers to the first and last lever to be vertical. Because a knee-joint lever changes the direction of the force between the input and output, the preferred arrangement has at least a pair of knee-joint levers with equal and opposite direction-changing angles. As a result, the change in force direction associated with the pair of knee-joint levers is essentially negligible.

To obtain an arrangement with only vertical or horizontal couplings, one would use knee-joint levers in which the force-introduction arm and the force-output arm are essentially at a 90° angle to each other, while the angle between the force-output arm and the anchoring arm is 90°+Φ. The force-reduction factor of a knee-joint lever of this kind has the numerical value of tan(Φ).

Because a knee-joint lever takes up only a small amount of space, the resulting loss in rigidity of the stationary support is insignificant. With the small amount of space required and with the possibility of prescribing the direction-changing angle, it is possible to design network-like arrangements of knee-joint levers with a very high degree of force reduction in relation to the space consumed. The knee-joint levers can be used either by themselves as intermediate levers, or also in combination with at least one additional straight lever. In the latter case, the additional straight lever is pivoted in a fulcrum located either on the stationary support or on another lever.

When there are more than two straight levers arranged in parallel and vertically above one another, at least one lever arm will have to transfer a force that is directed. towards a corresponding arm of the next lever. Because the coupling elements can only pull, but not push, i.e., they can carry only tensile forces, it is customary to design reach-around arrangements with a lever portion conducting a compressive (pushing) force and a coupling element transferring a tensile force. Instead of using a space-consuming arrangement of this kind, which contributes nothing to the force-reduction ratio, a combination of two consecutive knee-joint levers allows the pushing force to be converted to a parallel pulling force with a strong lever reduction taking place at the same time. Each of the two knee-joint levers redirects the force by an angle of 90°, so that the total change in direction is 180°. The change of 180° in the direction of the force makes it possible to connect lever arms through a pair of knee-joint levers where otherwise a reach-around arrangement would have to be used.

It is self-evident that instead of the horizontally oriented straight levers it is also possible to use levers running in other, arbitrarily selectable directions. Knee-joint levers with appropriate direction-changing angles can be used to connect straight levers of different angular orientation. The use of knee-joint levers and/or straight levers that are fulcrum-supported on another lever significantly increases the design freedom to arrange levers in a material block. The increased design freedom allows large force-reduction ratios to be accomplished within a small amount of space.

DETAILED DESCRIPTION OF THE PREFERRED EMBODIMENT

Figure 1:
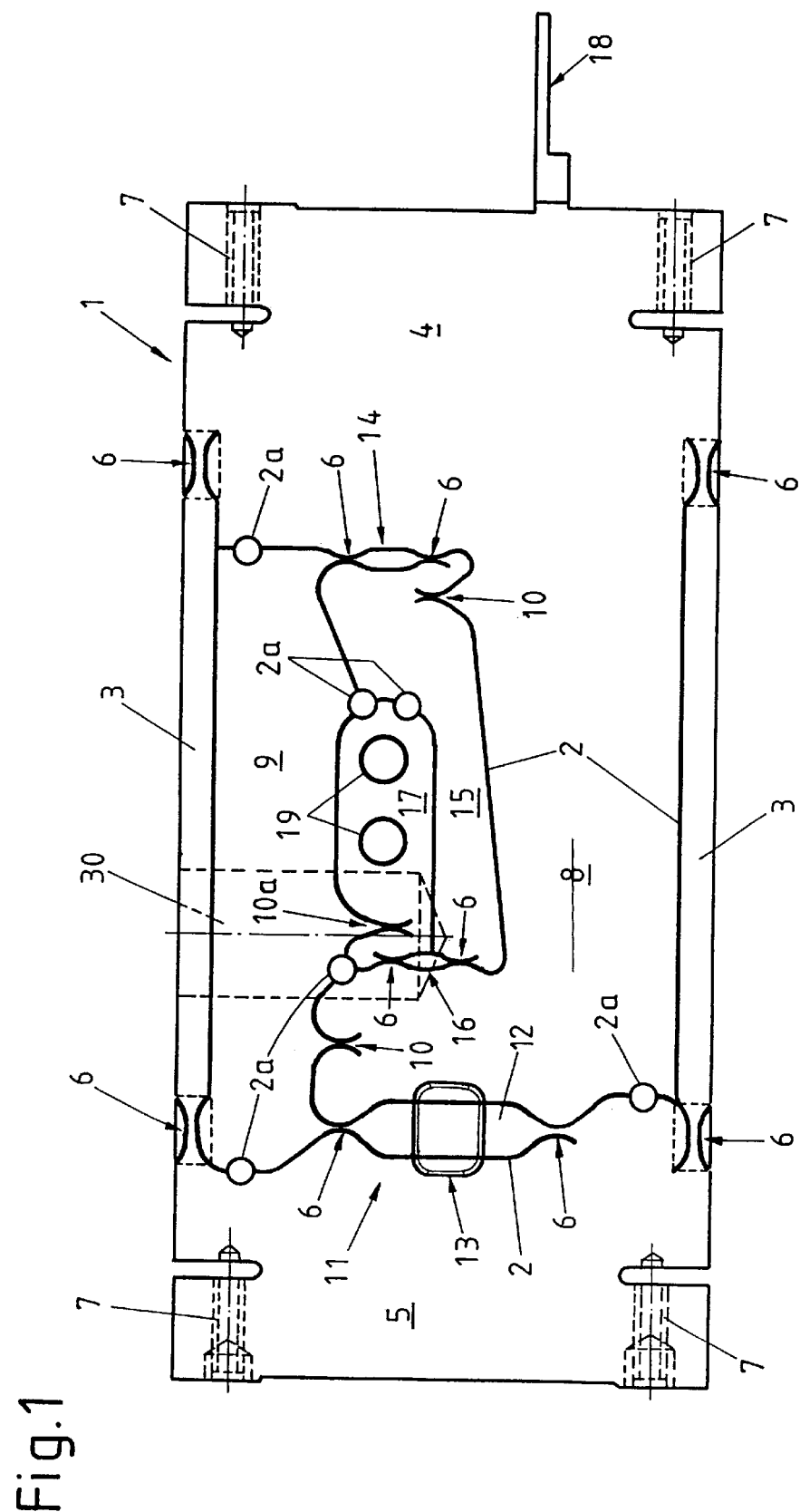
FIG. 1 of the attached drawing represents a side view of a material block with a stationary support, a parallelogram linkage and a nested arrangement of three levers.

FIG. 1 illustrates a brick-shaped material block 1 that is divided into different functional parts by material-free separating gaps 2. The separating gaps 2 traverse the entire depth of the material block 1 in the direction perpendicular to the drawing plane of FIG. 1. The separating gaps 2 are produced by removing a minimal amount of material, e.g., by spark erosion with a spark-erosion wire. To facilitate the insertion of the spark-erosion wire in the production process, the material block has at least one bore hole 2a for each of the narrow separating gaps 2. The material portions at the long sides at the top and bottom of the material block are configured as parallel-guiding members 3. At the short sides running perpendicular to the parallel-guiding members 3, the material block 1 contains at one end a stationary leg 4 of the parallelogram and at the opposite end a movable leg 5. The parallel-guiding members 3 are connected to the legs 4 and 5 by thin, flexibly pivoting material portions 6. These flexible portions 6 allow a minimal amount of translatory, parallel-guided deflection of the movable leg 5 in relation to the stationary leg 4.

When the mechanism is used in a balance, the stationary leg 4 of the parallelogram is installed in a housing (not shown) by means of screw bolts inserted in the bore holes 7. A load receiver (likewise not shown) is attached to the movable leg 5 of the parallelogram by means of screw bolts inserted in the bore holes 7. The movement of the load receiver attached to the movable leg 5 is guided by the parallelogram linkage, as described above. In order to prevent an undesirable effect of the parallel-guiding system on the mobility of the load receiver, the flexible portions 6 are placed exactly at the corners of the parallelogram and are configured as thin, flexibly pivoting material portions.

To allow the material block 1 to be used in a balance with a magnetic force-compensation device, it is necessary to reduce the force introduced from the load receiver into the movable leg 5, so that the resultant lever-reduced force falls within a range that is compatible with the capabilities of the compensation device. The requisite lever reduction is accomplished through a high-ratio lever mechanism shaped out of material portions contained within the interior part of the material block that is surrounded by the parallel-guiding system composed of the elements 3 to 6. The large portion that is of one piece with the stationary leg 4 represents a stationary support 8. A first lever 9 is supported rotatably by a stationary fulcrum 10 on the stationary support 8. The fulcrum is designed as a flex pivot, i.e., as a thin, flexible material connection between the stationary support and the first lever 9. The force acting on the movable leg 5 of the parallelogram is communicated through a first coupling element 11 to the short arm of the first lever 9. The first coupling element 11 has two flexible portions 6 with a connector link 12 between them. The mid-portion of the connector link 12 is reduced in thickness by the removal of material from the front and back of the block in the area 13. The reduced-thickness portion of the connector link 12, a thin central web, provides the coupling element 11 with the required torsional flexibility, so that any torsion taking place between the stationary part and the movable part of the material block cannot introduce harmful stresses through the coupling element 11 into the lever 9. The lower flexible portion 6 of the coupling element 11 connects the movable leg 5 of the parallelogram to the connector link 12. The upper flexible portion 6 of the coupling element 11 connects the connector link 12 to the first lever 9.

The first lever 9 is connected to a second lever 15 by way of a second coupling element 14, again with two flexible portions 6 and a connector link between them. Preferably, the geometry of the arrangement is such that the respective upper flexible portions 6 of the first and second coupling elements 11, 14 and the stationary fulcrum 10 are in straight alignment with each other. Errors caused by the force-reduction system can thereby be minimized. The second lever 15 is rotatably supported by a stationary fulcrum 10 on the stationary support 8 and connected to a third lever 17 by way of a third coupling element 16, again composed of two flexible portions 6 with a connector link between them. In this case also, the geometry of the arrangement is such that one flexible portion 6 of the second coupling element 14, one flexible portion 6 of the third coupling element 16 and the stationary fulcrum 10 of the second lever 15 are in straight alignment with each other.

The third lever 17 is rotatably supported by a movable fulcrum 10a on the first lever 9. The motion of the third lever is conveyed by way of a fork-shaped lever extension (not illustrated in the drawing, but attachable at the bore holes 19) to a compensation device (likewise not shown). The stationary part of the compensation device can be connected to the stationary leg 4 of the parallelogram, e.g., on a cantilever support 18 as indicated in the drawing. The movable part of the compensation device is attached to the free end of the fork-shaped lever extension. Interactive electromagnetic forces between the stationary part and the movable part of the compensation device are regulated by way of a position-sensor controlling the amount of current flowing through a coil, so that the movable part of the compensation device is maintained at a zero-deflection level. The amount of coil current that maintains a state of zero deflection represents a measure for the force whose deflecting effect is being compensated by the coil current.

Each of the three levers 9, 15 and 17 has a short arm extending to one side and a long arm extending to the opposite side of a fulcrum 10, or 10a in the case of the lever 17. Because the force is introduced into each lever at the short arm and passed on to the next lever at the long arm, the force that has to be supported becomes smaller in each successive lever. Accordingly, the first lever 9 is designed to have the greatest strength of the three levers. The second lever 15 can already be dimensioned in more slender proportions towards the end of the long lever arm. The first part of the third lever is only taking up a space between the first and the third lever that is not needed for any other purpose. This optimized use of the available space in the material block is possible only because the third lever has its supporting fulcrum on the first lever. Also, an arrangement as shown in FIG. 1, where the movable parallelogram leg 5 and the three parallel levers 9, 15 and 17 can be connected in such a way that all of the coupling elements 11, 14 and 16 are subjected to tensile forces, is possible only if one of the levers—in this case lever 17—has its fulcrum on a preceding lever. Because no reach-around combinations of a push-force transmitting lever portion with a tensile coupling element are required, the second and third lever can take up the maximum amount of available space between the stationary parallelogram leg 4 and the part of the stationary support where the fulcrum 10 of each respective lever is located. The stationary support 8 still has the required amount of structural rigidity at the fulcrum supports 10 even if the material block is of equal size as in a force-reduction mechanism with only two levers.

The reduction ratio of the three-lever system 9, 15, 17 as described here, with the third lever fulcrum located on the first lever, is equal to the product of the individual ratios except for a correction. The multiplication of the individual reduction ratios would lead to an overall ratio of 1/1455. With a correction allowing for the fact that the third lever fulcrum is located on the first lever, the effective reduction ratio turns out to be 1/1484. With the fulcrum of the third lever being located on the first lever, the correction leading to the effective reduction ratio depends on the distance between the respective fulcra of the first and third lever. In the subject case, the distance was 14.2 mm. This leads to the conclusion that the reduction ratio is increased if the fulcrum of a lever is located o n a preceding lever of the mechanism. In addition to the space savings, the increase of the lever-reduction ratio is a further advantage of the inventive concept, according to which at least one lever has a fulcrum that is fixed on a preceding lever.

Figure 2:
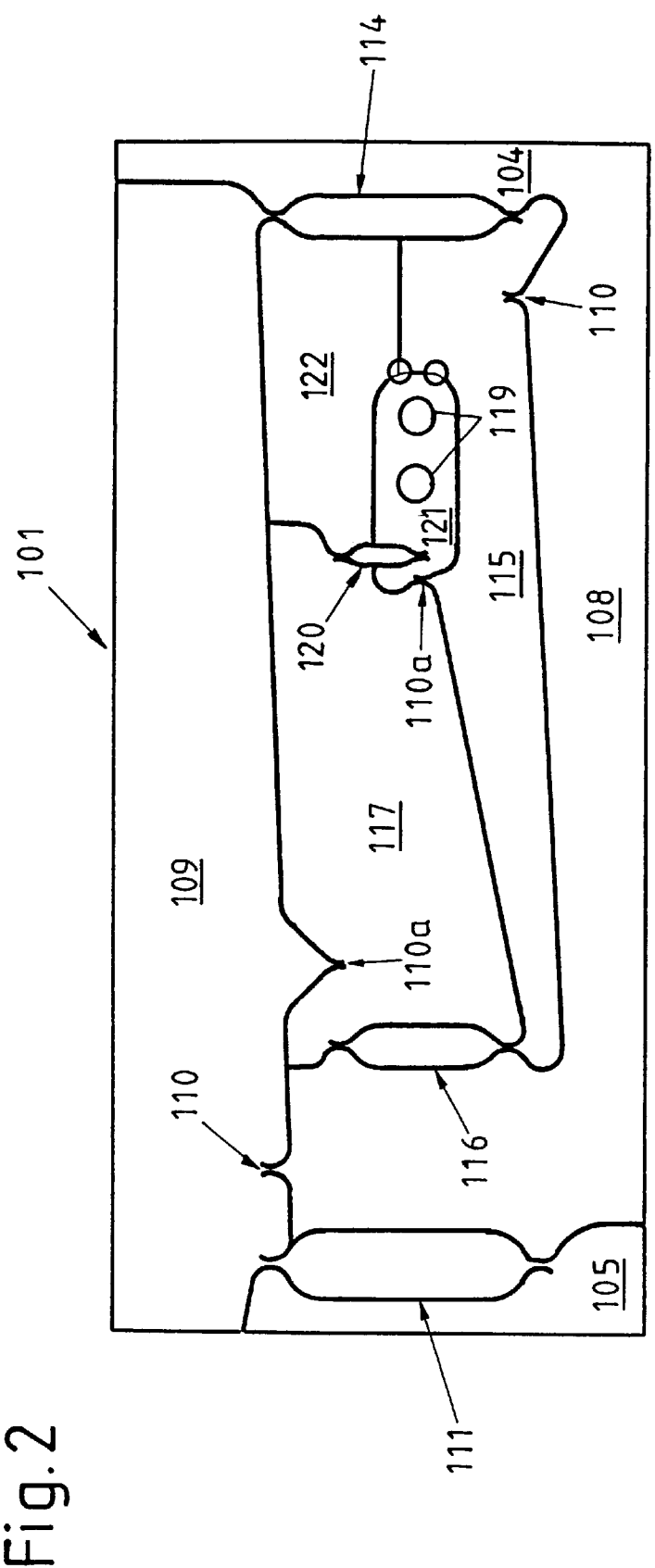
FIG. 2 represents a side view of a material block with a stationary support and a nested arrangement of four levers.

Because the forces acting on the third lever are significantly smaller than the original input forces introduced into the first lever, the third coupling element and the fulcrum 10a of the third lever 17 need to be of a sufficiently soft flexibility so that they will not introduce errors into the transmission of forces through the mechanism. In the illustrated embodiment, a blind bore hole 30, centered with regard to the depth of the material block, serves to reduce the stiffness of the third coupling element 16 and the fulcrum 10a of the third lever. FIG. 2 illustrates a material block 101 without a parallel-guiding system, containing only a stationary support 108 with a nested combination of four levers. The material block 101 can be installed into a separate parallel-guiding unit by connecting the movable part of the parallel-guiding system to the movable part 105 of the material block 101 and the stationary part of the parallel-guiding system to the stationary part 104 of the material block 101. As is self-evident, FIG. 2 can also be interpreted as a representation of only the interior portion of a material block 1 with the parts 3 to 6 of the parallelogram linkage having been omitted from the drawing.

The first coupling element 111 connects the movable input part 105 to the first lever 109. The first lever, in turn, is connected to the second lever 115 by way of a second coupling element 114. Continuing the train of force reduction, the second lever 115 is connected to the third lever 117 by way of the third coupling element 116. The third lever 117 is connected to the fourth lever 121 through a fourth coupling element 120. The fourth lever 121 has attachment holes 119 for the installation of a fork-shaped lever extension. The area 122 represents an unused portion and can therefore be removed from the material block. The first lever 109 and the second lever 115 are supported by stationary fulcra 110 on the stationary support 108. The third lever 117 has a movable fulcrum 110a on the first lever 109, and the fourth lever 121 has another movable fulcrum 110a on the second lever 115. The fulcrum 110a of the fourth lever is located at the end of the fourth lever. In other words, the force input and the force output are both located on the same arm of the fourth lever 121. As this embodiment demonstrates, the mechanism according to the invention can also have more than one lever fulcrum supported by a preceding lever. It is self-evident that instead of, or in addition to, the straight levers illustrated, one could also use angular levers where the lever arms enclose an angle other than 180° or 0°.

Figure 3:
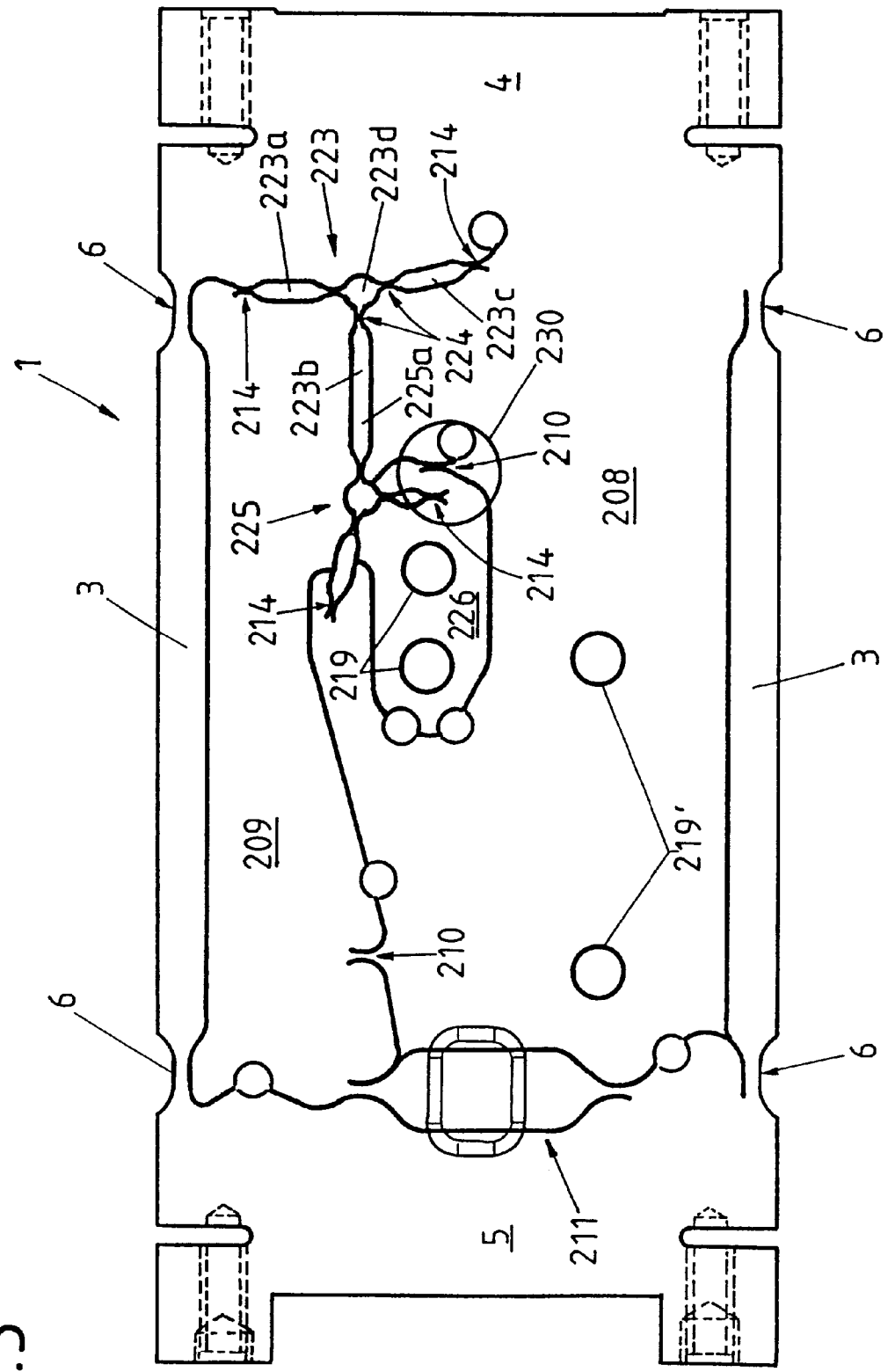
FIG. 3 represents a side view of a material block with a stationary support, a parallelogram linkage and an arrangement of two knee-joint levers.

FIG. 3 illustrates an embodiment where the load is introduced into the first lever 209 through a first coupling element 211. The first lever 209 is supported by a fulcrum 210 on the stationary support 208. From the output arm of the first lever 209, the reduced force is passed on to a first knee-joint lever 223 through a thin, flexible connection 214. The first knee-joint lever 223 has a force-introduction arm 223a, a force-output arm 223b, and an anchored arm 223c. The three arms are connected to a movable hub or movable fulcrum 223d through thin, flexible connections 224. A force acting on the force-introduction arm will cause a slight amount of displacement of the hub 223d. The anchored arm 223c of the knee-joint lever 223 is connected to the stationary support through a thin, flexible connection 214. The force-output arm 223b is essentially of one piece with the force-introduction arm 225a of a second knee-joint lever 225. The anchored arm 225c of the second knee-joint lever 225 is connected to the stationary support 208 through a thin, flexible connection 214. The force-output arm 225b of the second knee-joint lever 225 is connected to a further lever 226 through a thin, flexible connection 214. The further lever 226 is supported by a fulcrum 210 on the stationary support 208. Because the forces acting on the further lever 226 are small, the thin, flexible connection 214 of the further lever 226 as well as its fulcrum 210 need to be of sufficiently soft flexibility so that they will not introduce errors into the transmission of forces through the mechanism. The illustrated embodiment has blind bore holes 230 from the front and back of the material block to reduce the cross-section and thus increase the flexibility of the flexible connection 214 and the fulcrum 210 of the further lever 226. As in the previously discussed embodiments, a fork-shaped lever extension (not shown) is installed on the further lever 226 by means of the attachment holes 219. The fork-shaped lever extension reaches from the last lever (in this embodiment the further lever 226) to the compensation device.

The angle between the force-introduction arm and the force-output arm is essentially 90° in both of the knee-joint levers 223 and 225, while the angle between the force-output arm and the anchored arm is 90°+Φ. The force-reduction factor of a knee-joint lever of this kind has the numerical value of tang(Φ). In order to achieve a large force-reduction ratio, a small angle Φ is selected, preferably smaller than 20°, a particularly preferred value being 12°. Because the first knee-joint lever 223 changes the direction of the force by 90°, a second knee-joint lever 225 follows the first knee-joint lever 223, redirecting the force by 90° in the opposite sense, so that the force has the same direction before and after passing through the combination of the knee-joint levers 223, 225. In a case where the redirecting angle of the knee-joint levers is different from 90°, it is nevertheless advantageous to use a pair of knee-joint levers with essentially equal redirecting angles of opposite orientation, so that the combined redirecting angle of the two knee-joint levers is of an essentially negligible magnitude.

It is self-evident that at least one straight lever could be interposed between the two knee-joint levers, resulting in an arrangement where not all of the straight levers would run parallel to each other. This could in some cases be desirable, particularly if it allows the force-reduction ratio to be increased in relation to a given size of the material block. The knee-joint levers take up very little space, because all of the forces occurring in a knee-joint lever are essentially tensile forces.

The stationary support 208 of the embodiment of FIG. 3 has attachment holes 219' for the installation of the stationary part of a force-compensation device. The movable part of the compensation device is attached to the free end of the fork-shaped extension of the further lever 226. Interactive electromagnetic forces between the stationary part and the movable part of the compensation device are regulated by way of a position-sensor controlling the amount of current flowing through a coil, so that the movable part of the compensation device is maintained at a zero-deflection level. The amount of coil current that maintains the state of zero deflection represents a measure for the force whose deflecting effect is being compensated by the coil current.

What is claimed is:

1. A force-reduction mechanism for a force-measuring device, comprising a stationary support, a plurality of levers with a first lever and at least one additional lever, fulcra that rotatably support the levers, and coupling elements connecting the levers, wherein the levers follow each other in a functional sequence, the first lever is supported by a first fulcrum located on the stationary support, a force to be reduced by the mechanism is introduced to the first lever by way of a first coupling element, the at least one additional lever is connected to a preceding lever in the functional sequence through an additional coupling member, the stationary support, the levers and the coupling members are at least in part configured as distinct portions of a monolithic material block, and at least one of the additional levers has a fulcrum that is movable in relation to the stationary support.

2. The mechanism of claim 1, wherein the movable fulcrum is supported by a preceding lever and shares the movement of said preceding lever.

3. The mechanism of claim 2, comprising a first, second and third lever with a first, second and third fulcrum, respectively, the first and second fulcrum being supported by the stationary support and the third fulcrum being supported by the first lever.

4. The mechanism of claim 2, comprising a first, second, third and fourth lever with a first, second, third and fourth fulcrum, respectively, the first and second fulcrum being supported by the stationary support, the third fulcrum being supported by the first lever, and the fourth fulcrum being supported by the second lever.

5. The mechanism of claim 1, wherein the at least one additional lever is a knee-joint lever comprising a force-introduction arm, a force-output arm, an anchored arm, and a movable hub, the three arms being joined together at the hub, the force-introduction arm and the force-output arm enclosing between each other a force-redirecting angle different from 180° and 0°, so that a force acting on the force-introduction arm will cause a slight amount of displacement of the hub.

6. The mechanism of claim 5, wherein the force-introduction arm of at least one knee-joint lever is connected to a preceding lever through a thin, flexible connection, the force-output arm of said knee-joint lever is connected to a following lever in the functional sequence of levers, and the anchored arm of said knee-joint lever is connected to the stationary support through a thin, flexible connection.

7. The mechanism of claim 5, comprising at least a pair of knee-joint levers with a first and second knee-joint lever, where the respective force-redirecting angles of the first and second knee-joint lever are of essentially equal magnitude but opposite orientation, so that the combined force-redirecting angle of the pair of knee-joint levers is essentially zero.

8. The mechanism of claim 5, wherein the force-redirecting angle is 90°, the force-output arm and the anchored arm enclose between each other an anchor-arm angle of 90°+Φ and, as a result, the reduction factor of the knee-joint lever has a numerical value equal to tan(Φ).

* * * * *